United States Patent
Cohagan et al.

(10) Patent No.: US 7,360,699 B2
(45) Date of Patent: *Apr. 22, 2008

(54) GEOGRAPHIC AREA MULTIPLE SERVICE CARD SYSTEM

(75) Inventors: Perry A Cohagan, Brooklyn Heights, NY (US); Mary Ann Fitzmaurice, New York, NY (US); Aliza Freud, New York, NY (US); Birgitta Mayer, New York, NY (US); Julia Menichilli, Manhasset, NY (US); Jason Nanton, Singapore (SG); Ray Sharp, Coral Springs, FL (US); Scott Vosburgh, Greensboro, NC (US); Penelope Wood-Kulko, Brooklyn, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/550,067

(22) Filed: Oct. 17, 2006

(65) Prior Publication Data

US 2007/0084914 A1   Apr. 19, 2007

Related U.S. Application Data

(63) Continuation of application No. 10/708,580, filed on Mar. 12, 2004, now Pat. No. 7,163,145, which is a continuation of application No. 09/764,688, filed on Jan. 16, 2001, now Pat. No. 6,742,704.

(60) Provisional application No. 60/177,530, filed on Jan. 21, 2000, provisional application No. 60/482,644, filed on Jun. 26, 2003.

(51) Int. Cl.
   *G07B 15/02*   (2006.01)

(52) U.S. Cl. ................................ 235/384; 235/380
(58) Field of Classification Search ................ 235/384, 235/380, 383, 375, 379; 705/35, 41
   See application file for complete search history.

(56) References Cited

U.S. PATENT DOCUMENTS

| | | | |
|---|---|---|---|
| 4,087,660 A | 5/1978 | Sedley |
| 4,358,672 A | 11/1982 | Hyatt et al. |
| 4,473,825 A | 9/1984 | Walton |
| 4,546,241 A | 10/1985 | Walton |
| 4,609,812 A | 9/1986 | Drexler |
| 4,634,848 A | 1/1987 | Shinohara et al. |
| 5,502,636 A | 3/1996 | Clarke |
| 5,557,516 A | 9/1996 | Hogan |
| 5,578,808 A | 11/1996 | Taylor |
| 5,748,737 A | 5/1998 | Daggar |
| 5,814,796 A | 9/1998 | Benson et al. |

(Continued)

*Primary Examiner*—Ahshik Kim
(74) *Attorney, Agent, or Firm*—Snell & Wilmer L.L.P.

(57) ABSTRACT

The invention provides consumers with the services of multiple cards or accounts while allowing consumers to carry a single card, transponder, code and/or other access device. Because the card may access combined services such as financial transaction services and transportation services, the system may facilitate charging the financial account for the transportation services. The system may allow the consumer to use loyalty points or geographic based loyalty points to pay for the transportation services. The system may also limit the use of certain loyalty points based upon the geographic area for certain transportation services in certain geographic areas.

15 Claims, 8 Drawing Sheets

U.S. PATENT DOCUMENTS

| | | | |
|---|---|---|---|
| 5,828,044 A | 10/1998 | Jun et al. | |
| 5,834,748 A | 11/1998 | Litman | |
| 5,844,230 A | 12/1998 | Lalonde | |
| 5,901,303 A | 5/1999 | Chew | |
| 5,915,023 A | 6/1999 | Bernstein | |
| 5,923,016 A | 7/1999 | Fredregill et al. | |
| 5,963,647 A | 10/1999 | Downing et al. | |
| 5,969,318 A * | 10/1999 | Mackenthun | 235/380 |
| 5,983,196 A | 11/1999 | Wendkos | |
| 5,984,191 A | 11/1999 | Chapin, Jr. | |
| 5,988,500 A | 11/1999 | Litman | |
| 5,991,376 A | 11/1999 | Hennessy et al. | |
| 6,003,014 A | 12/1999 | Lee et al. | |
| 6,012,636 A | 1/2000 | Smith | |
| 6,032,136 A | 2/2000 | Brake et al. | |
| 6,085,976 A | 7/2000 | Sehr | |
| 6,141,161 A | 10/2000 | Sato et al. | |
| 6,375,084 B1 | 4/2002 | Stanford et al. | |
| 6,402,029 B1 | 6/2002 | Gangi | |
| 6,402,039 B1 | 6/2002 | Freeman et al. | |
| 6,452,498 B2 | 9/2002 | Stewart | |
| 6,484,940 B1 | 11/2002 | Dilday et al. | |
| 6,486,768 B1 | 11/2002 | French et al. | |
| 6,510,998 B1 | 1/2003 | Stanford et al. | |
| 6,522,889 B1 | 2/2003 | Aarnio | |
| 6,549,912 B1 | 4/2003 | Chen | |
| 6,577,229 B1 * | 6/2003 | Bonneau et al. | 340/10.41 |
| 6,609,655 B1 | 8/2003 | Harrell | |
| 6,631,849 B2 | 10/2003 | Blossom | |
| 6,648,222 B2 | 11/2003 | McDonald et al. | |
| 6,705,518 B2 | 3/2004 | Park et al. | |
| 6,715,679 B1 | 4/2004 | Infosino | |
| 2001/0047342 A1 | 11/2001 | Cuervo | |
| 2001/0054003 A1 | 12/2001 | Chien et al. | |
| 2002/0026348 A1 | 2/2002 | Fowler et al. | |
| 2002/0046110 A1 | 4/2002 | Gallagher | |
| 2002/0049631 A1 | 4/2002 | Williams | |
| 2002/0055874 A1 | 5/2002 | Cohen | |
| 2002/0069109 A1 | 6/2002 | Wendkos | |
| 2002/0077890 A1 | 6/2002 | LaPointe et al. | |
| 2002/0095365 A1 | 7/2002 | Slavin et al. | |
| 2002/0107733 A1 | 8/2002 | Liu et al. | |
| 2002/0143614 A1 | 10/2002 | MacLean et al. | |
| 2002/0161630 A1 | 10/2002 | Kern et al. | |
| 2002/0194069 A1 | 12/2002 | Thakur et al. | |
| 2003/0004802 A1 | 1/2003 | Callegari | |
| 2003/0004808 A1 | 1/2003 | Elhaoussine et al. | |
| 2003/0009379 A1 | 1/2003 | Narasimhan et al. | |
| 2003/0013438 A1 | 1/2003 | Darby | |
| 2003/0036425 A1 | 2/2003 | Kaminkow et al. | |
| 2003/0040964 A1 | 2/2003 | Lacek | |
| 2003/0055722 A1 | 3/2003 | Perreault et al. | |
| 2003/0069787 A1 | 4/2003 | Tendon et al. | |
| 2003/0087650 A1 | 5/2003 | Aarnio | |
| 2003/0101131 A1 | 5/2003 | Warren et al. | |
| 2003/0200142 A1 | 10/2003 | Hicks et al. | |
| 2003/0200144 A1 | 10/2003 | Antonucci et al. | |

\* cited by examiner

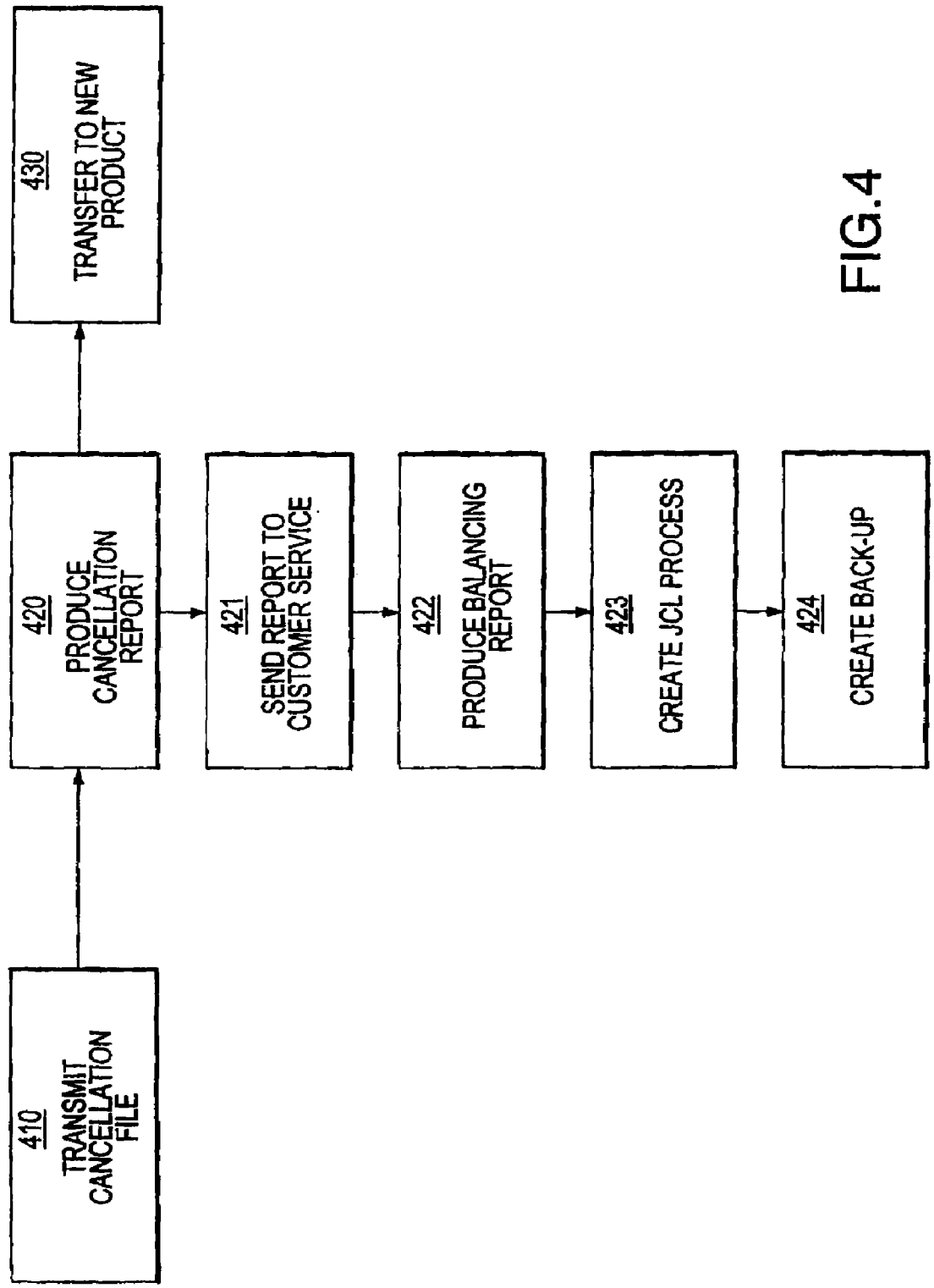

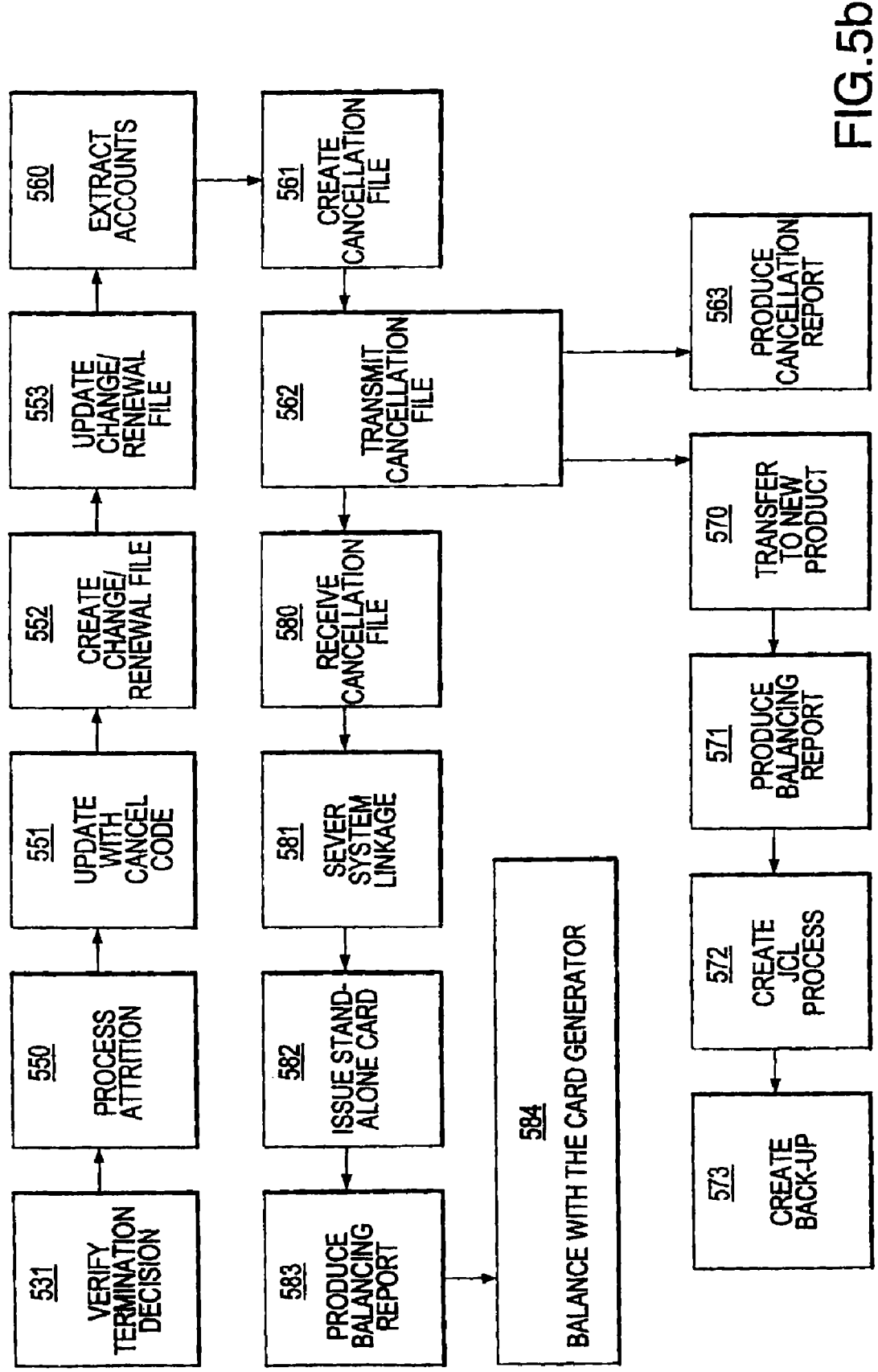

GEOGRAPHIC AREA MULTIPLE SERVICE CARD SYSTEM

CROSS REFERENCE TO RELATED APPLICATIONS

This application is a continuation of U.S. Ser. No. 10/708,580 filed on Mar. 12, 2004 and entitled "Geographic Area Multiple Service Card System" now U.S. Pat. No. 7,163,145; which application is a continuation-in-part of U.S. Ser. No. 09/764,688 filed on Jan. 16, 2001 and entitled "Multiple-Service Card System", now U.S. Pat. No. 6,742,704 (which itself claims benefit from U.S. Provisional Patent Application Ser. No. 60/177,530, filed Jan. 21, 2000) and also claims priority to U.S. Provisional Patent Application Ser. No. 60/482,644, filed Jun. 26, 2003, all of which are hereby incorporated by reference.

FIELD OF INVENTION

The present invention generally relates to credit card and transportation card services and, more particularly, to a system for providing a single card that functions as both a credit card, for gaining access to credit services provided by a primary party, and a transportation card, for gaining access to one or more transportation system which is administered by a service partner.

BACKGROUND OF THE INVENTION

In today's world, there is a wide variety of services that are available to a consumer where access to the services depends upon the consumer's possession of a card or code. For example, some of the services to which a typical consumer may gain access by possessing a card, include entry to a transportation service (e.g., public transportation), access to a membership club, entry to an access-restricted location, access to credit services, telephone system use, and accrual of loyalty rewards/incentives such as frequent flier miles or grocery store discounts and rebates.

Due to the desirability of such services, consumers in today's world typically carry a wide array of cards in their wallets and purses. The cards consumers now carry include, among others, credit cards, driver's licenses, subway access cards, bus cards, train passes, frequent flier cards, professional registration cards, retailer loyalty cards, and security-related restricted-access cards. Typically, each of these consumer cards contains information about the specific user or consumer, information about the service or benefit provider and information defining the memberships or services to which the consumer is entitled by virtue of his or her possession of the card. The information concerning the consumer may include photographs, signatures, fingerprints, biometrics and other information that identifies or describes the consumer. Information regarding the identity of the service provider, and the associated services to which the consumer is entitled, may be readily ascertained by reading the face of the card, may be encoded or accessed by using the card. Information may be incorporated onto the cards through a variety of means including imprinting, punching, laminating, embossing, bar encoding, magnetic stripe encoding, and even affixation or incorporation of microchips.

Unfortunately, due to the proliferation of memberships and services currently available from diverse service providers, the quantity of cards that average consumers carry has become unreasonably and unnecessarily burdensome. For example, on a single shopping trip, a typical consumer may carry a drivers license to drive their motor vehicle to the merchant's location, a transportation card to obtain access to public transportation, a membership card to obtain access to the merchant's exclusive membership shopping club (e.g., Costco), a calling card to make phone calls during the shopping trip, and a credit card to obtain credit services to facilitate the purchase of goods from the merchant. Yet, it can be cumbersome and uncomfortable to carry all these necessary cards in one's wallet, pocket or purse.

Thus, it would be advantageous to decrease the volume of cards that a consumer must carry while retaining the consumer's access to the full array of services provided by the diversity of service providers. Simultaneous with the desire to reduce the volume of cards, there is an evident need to increase the information carrying capacity or information accessibility using such consumer cards. Furthermore, the prior art attempts at reducing the quantity of cards a consumer must carry are typically aimed at modifying the cards, rather than modifying the processes and systems employed by the individual benefit providers, such that the consumer may continue to enjoy benefit from multiple providers. In fact, none of the methods or systems for providing a multiplicity of services through a single card that are known in the art involve substantial administrative cooperation between distinct service providers.

Furthermore, it has become apparent that consumers who seek access to a particular set of services from one service provider are more likely to desire access to a second set of services from a distinct class of service providers. For example, it stands to reason that consumers who access a transportation system are likely to desire credit services during their trip to a merchant. Therefore, it would be advantageous for providers of distinct services such as credit services and transportation services to cooperate to offer a single card that provides consumers with access to the services of the currently separate and distinct cards. By doing so, a primary party provider of credit services and a partnering transportation organization can encourage use of their respective services while providing a synergistic administrative benefit to themselves and their consumers.

Moreover, in addition to credit services and transportation services, the cards may be used for loyalty programs. Because numerous loyalty programs exist, businesses have a difficult time differentiating their loyalty programs from other loyalty programs on the market. Moreover, many consumers often travel for work related reasons, so they may not desire to use their loyalty points to travel to distant cities or distant countries. Rather, many consumers enjoy the services of their "hometown" region, including local restaurants, local theaters, local sporting activities and other events. At the same time, marketers have begun to understand that many consumers develop a strong pride, emotional affinity and loyalty to the geographic region where they live. As such, a long-felt need exists for a multiple service card which includes a loyalty program which rewards consumers for purchases in certain local geographic areas and which enables consumers to utilize their loyalty points in similar local geographic areas.

SUMMARY OF THE INVENTION

The present invention facilitates providing consumers with the services of multiple cards or accounts while allowing consumers to carry a single card, transponder, code and/or other access device. The card may include one or more magnetic stripes. The invention enables a single card to function in multiple modes, for example, as both a credit card and a separate service partner's transportation card. The invention also provides methods for opening new accounts, methods for accomplishing card replacement, methods for canceling a transportation service, methods for canceling a primary party account, and methods for transferring an account to a different service partner account. The multiple-service card may include any combination of demographic information, a barcode, magnetic stripes, biometric and a photo in addition to standard credit card information.

Because the card may access combined services such as financial transaction services and transportation services, the system may facilitate charging the financial account for the transportation services. The system may allow the consumer to use loyalty points or geographic based loyalty points to pay for the transportation services. The system may also limit the use of certain loyalty points based upon the geographic area for certain transportation services in certain geographic areas.

More specifically, the system includes a multiple service card configured to access financial services provided by a provider of financial services via a financial account, wherein the financial account is associated with a consumer; and, provide the same consumer access to a transportation vehicle (e.g., bus, subway and train) provided by a service partner. The invention also includes a method for facilitating obtaining access to a transportation vehicle by using a multiple service card to charge fees related to the access to an account associated with a provider of credit services. The method includes: providing a multiple service card to a consumer, wherein the card provides access to a transportation vehicle and facilitates financial transactions; maintaining, by the provider of credit services, a financial account corresponding to the multiple service card of the consumer; receiving a request to charge an amount to obtain access to the transportation vehicle from the service partner; determining if the requested service partner is affiliated with the provider of credit services; adjusting the financial account based upon the request and the amount; and, crediting an account of the service partner.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

FIG. 4 is a flowchart of an exemplary multiple-service card service partner cancellation process in accordance with the present invention.

DETAILED DESCRIPTION OF EXEMPLARY EMBODIMENTS

Figure 1:
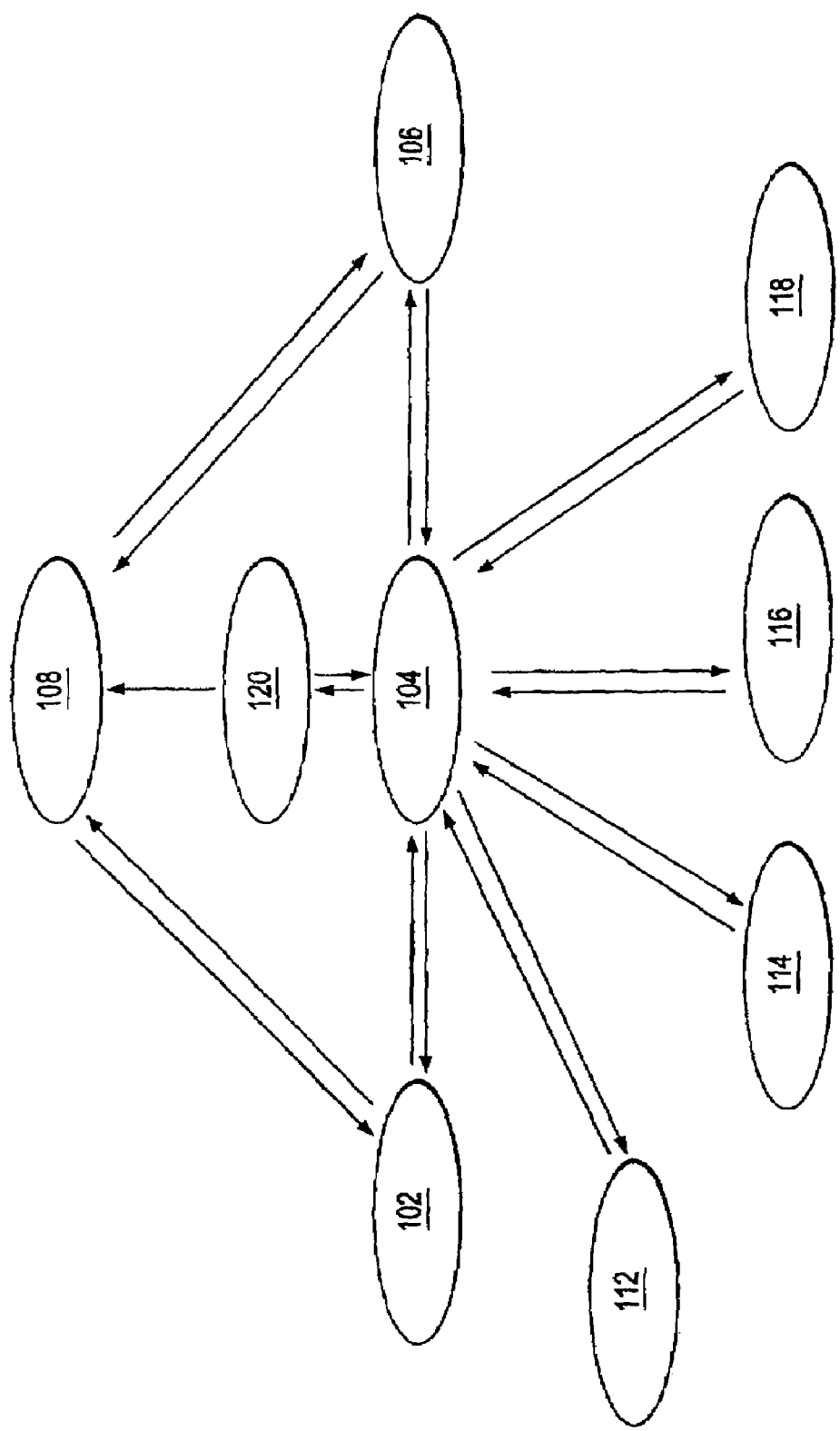
FIG. 1 is a schematic diagram of an exemplary system for providing a multiple-service card.

The present invention may be described herein in terms of functional block components, screen shots, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction to cryptography, see "Applied Cryptography: Protocols, Algorithms, And Source Code In C," written by Bruce Schneider published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system. It should further be noted that the order of the steps denoted in the attached drawings are not intended as limitations and the steps may be accomplished in other orders without deviating from the scope of the present invention. Still further, the actors denoted as performing individual steps in the disclosed process should not be interpreted as limiting in any way as one with ordinary skill in the art appreciates that the steps may be performed by actors different from those disclosed herein without deviating from the spirit and scope of the present invention.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The parties may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention may be implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

The consumer, merchant, primary party, and service partner may represent individual people, entities, or businesses. Although labeled as a "primary party," the primary party may represent other types of card issuing institutions, such as credit card companies, banks, card sponsoring companies, loyalty/incentive companies or third party issuers under contract with financial institutions. It is further noted that other participants may be involved in some phases of the system and methods, but these participants are not shown. Moreover, although many of the embodiments will be discussed with respect to transportation services, one skilled in the art will appreciate that the invention contemplates any other services or partners, such as, for example, entry to various transportation services (e.g., public transportation such as subways, buses and trains), access to a membership club, entry to an access-restricted location, access to credit services, telephone system use, and accrual of loyalty.

Additionally, although many of the embodiments be discussed with respect to a single, multi-service "card", as used herein, one skilled in the art will appreciate that the invention contemplates any other type of device or system, such as, for example, a card, transponder, fob, code, rewards card, charge card, credit card, debit card, prepaid card, telephone card, smart card, magnetic stripe card, bar code card, radio frequency card and/or other access device. The card may include one or more magnetic stripes, bar code and/or other information technology. For example, the card may include two magnetic stripes on one side, one magnetic stripe on the front and one magnetic stripe on the back, a card with multiple faces (e.g., telescopic, expanding or hinged card) and/or the like. The transponder or code may access multiple accounts related to the primary party and service partner, respectively. For example, see U.S. Ser. No. 10/608,792 filed on Jun. 27, 2003 by O'Malley, et al. and entitled "Method And Apparatus For Enrolling With Multiple Transaction Environments", which is hereby incorporated by reference. The "card" may also not include a physical card or other device; rather, the "card", as used herein, may simply be an account or account number. Additionally, a "cardholder" or "consumer" includes any person or entity that uses a consumer card and participates in the present system and may include a person who is simply in possession of a financial account identifier, such as an authorization or account code.

In one embodiment, a consumer 108 may be provided with a single card that serves as both a credit card and a transportation card for access to the service partner's transportation services. This multiple-service card may have the traditional credit card data on one side of the card, including, for example, the account number, name of the account holder, and the expiration date. The other side of the card may include a magnetic stripe that contains the account information in machine readable form, a space for a signature, a consumer service number, a service partner transportation serial number that is suitable to permit entry to a service partner's services or facility, a barcode with the same transportation information and that may be scanned at the point of sale, and a photograph or a digital image or another identifying image of the card holder. The photograph or other identifying image may be taken at the service partner's location. Any combinations of the foregoing data may be located on either side of the card.

The card may also be associated with an account or account number, wherein an "account" or "account number", as used herein, may include any device, code, number, letter, symbol, digital certificate, smart chip, digital signal, analog signal, biometric or other identifier/indicia suitably configured to allow the consumer to access, interact with or communicate with the system such as, for example, one or more of an authorization/access code, personal identification number (PIN), Internet code, other identification code, and/or the like. The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

Because the card may access combined services such as financial transaction services and transportation services, the system may facilitate charging the financial account for the transportation services. In this regard, upon using the card to access a transportation service, the system may also access the financial account and deduct the cost of the transportation service from the financial account. In one embodiment, the transaction may occur like a known point of sale retail purchase transaction. The deduction may be in substantially real-time, batch mode, periodically, upon request, based on an algorithm or any other routine. The system may allow the consumer to use loyalty points or geographic based loyalty points to pay for the transportation services. In this regard, the system may "convert" the loyalty points to a currency value. For more information related to converting loyalty points to a currency value, see, for example, U.S. Ser. No. 09/834,478 filed on Apr. 13, 2001 by Chien, et al. and entitled "System and Method for Using Loyalty Points," which is hereby incorporated by reference. The system may also limit the use of certain loyalty points based upon the geographic area for certain transportation services in certain geographic areas (as described below).

As illustrated in FIG. 1, in an exemplary embodiment, the system may include a primary party 102 provider of credit services as well as a service partner 106. Both the primary party 102 and the service partner 106 are equipped with a computing unit or system to facilitate online commerce transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like.

The primary party 102 and the service partner 106 both comprise computing units or systems, which may communicate with and through a card service engine 104, and all of which are connected with each other via a data communication network. The network may be a public network, which should be assumed to be insecure and open to eavesdroppers. For example, the internet may be employed as the network. In this context, the computers may or may not be connected to the Internet at all times. For instance, the service partner 106 computer may employ a modem to occasionally connect to the Internet, whereas the primary party's computing center might maintain a permanent connection to the Internet. It is noted that the network may also be implemented as other types of networks, such as an interactive television (ITV) network. The computers may also be interconnected via existing proprietary networks such as those that presently accommodate transactions for credit cards, debit cards, and other types of financial/banking cards. Such an interconnection is a closed network that may be assumed to be secure from eavesdroppers. Examples of these proprietary networks include the American Express®, VisaNet®, and the Veriphone® networks.

In general, in an exemplary embodiment, the multiple-service card is a credit card co-branded with a service partner transportation card. In one embodiment, a prospective consumer 108 provides the service partner 106 with application information for both the primary party's services and a service partner's services. Such information may include, for example, traditional credit card application information as well as traditional transportation application information. The service partner 106 collects and processes the application information, and forwards it to the primary party 102, via the card service engine 104, for further processing. The card service engine 104 approves or declines the new account, and returns the information to the service partner 106. The service partner 106, then, matches the approved accounts with the transportation applications it has previously processed. Finally, the service partner 106 sends its transportation information to a card generator 120, which fabricates the physical card and sends the card to the consumer 108. An example of the card fabrication process is found in U.S. patent application Ser. No. 09/653,837 entitled "Transaction Card" filed Sep. 1, 2000, the entire contents of which are herein incorporated by reference. The invention also contemplates the application information being sent initially to the primary party or separately to the primary party and the transportation partner.

In one embodiment, the primary party 102 and the service partner 106 participants cooperate to complete the processes associated with the provision of the combined card services. Those processes may include a new account process, card replacement and renewal processes, a cancellation of transportation services process, and a process for cancellation and/or transfer by a primary party 102. The card replacement and renewal process may be initiated by the primary party 102 or the service partner 106 and may be a response to a member's request, a member's reporting of fraudulent activity, an emergency, or the member's activity in association with a service partner 106. The system may also incorporate anti-terrorism software and devices to restrict access to financial accounts or transportation services under certain conditions. Each of the process participants performs a series of process steps.

The New Account Process

Figure 2A:
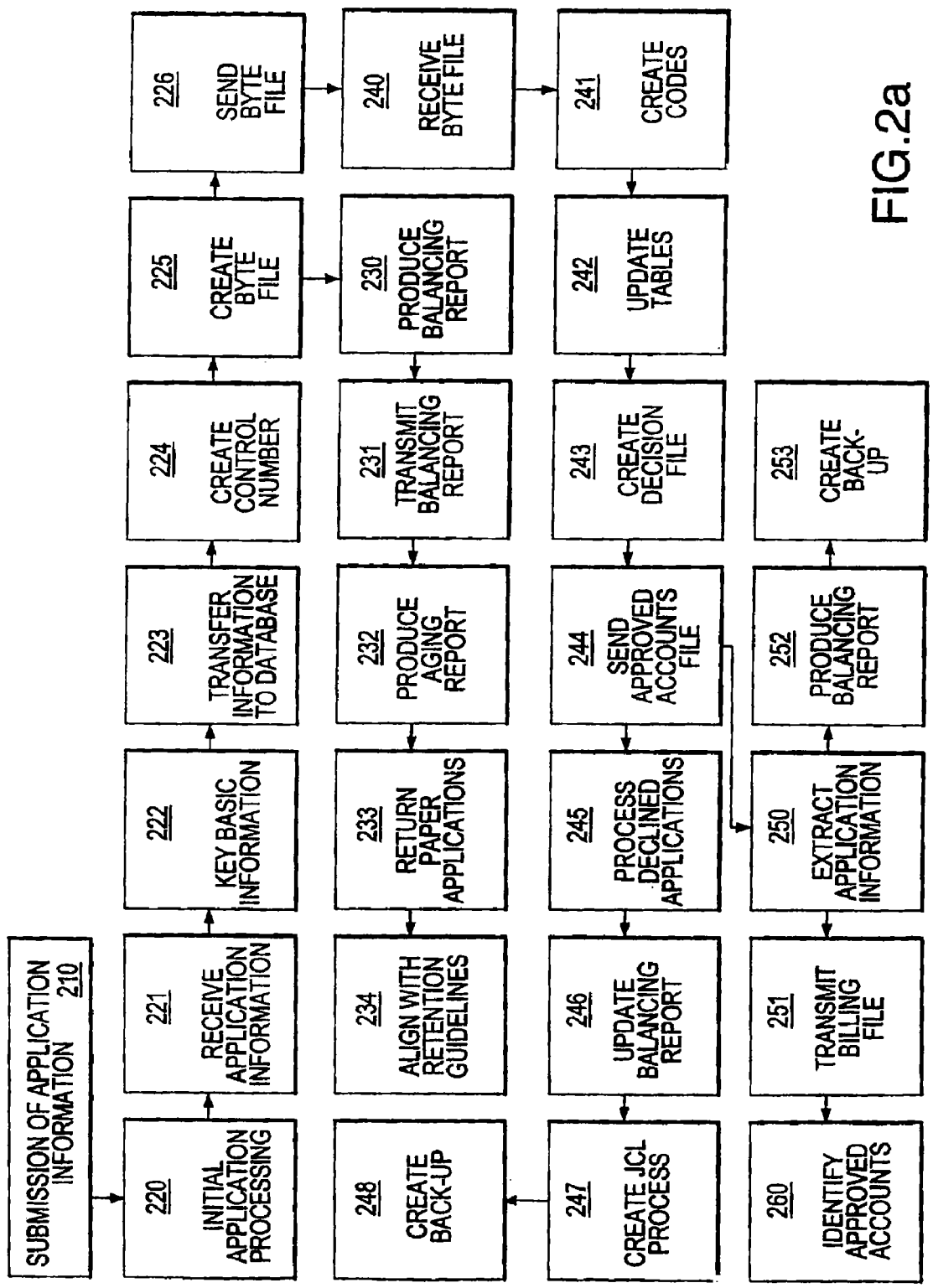
FIG. 2a is a flowchart of a portion of an exemplary new account process, complementing FIG. 2b, in accordance with the present invention.
Figure 2B:
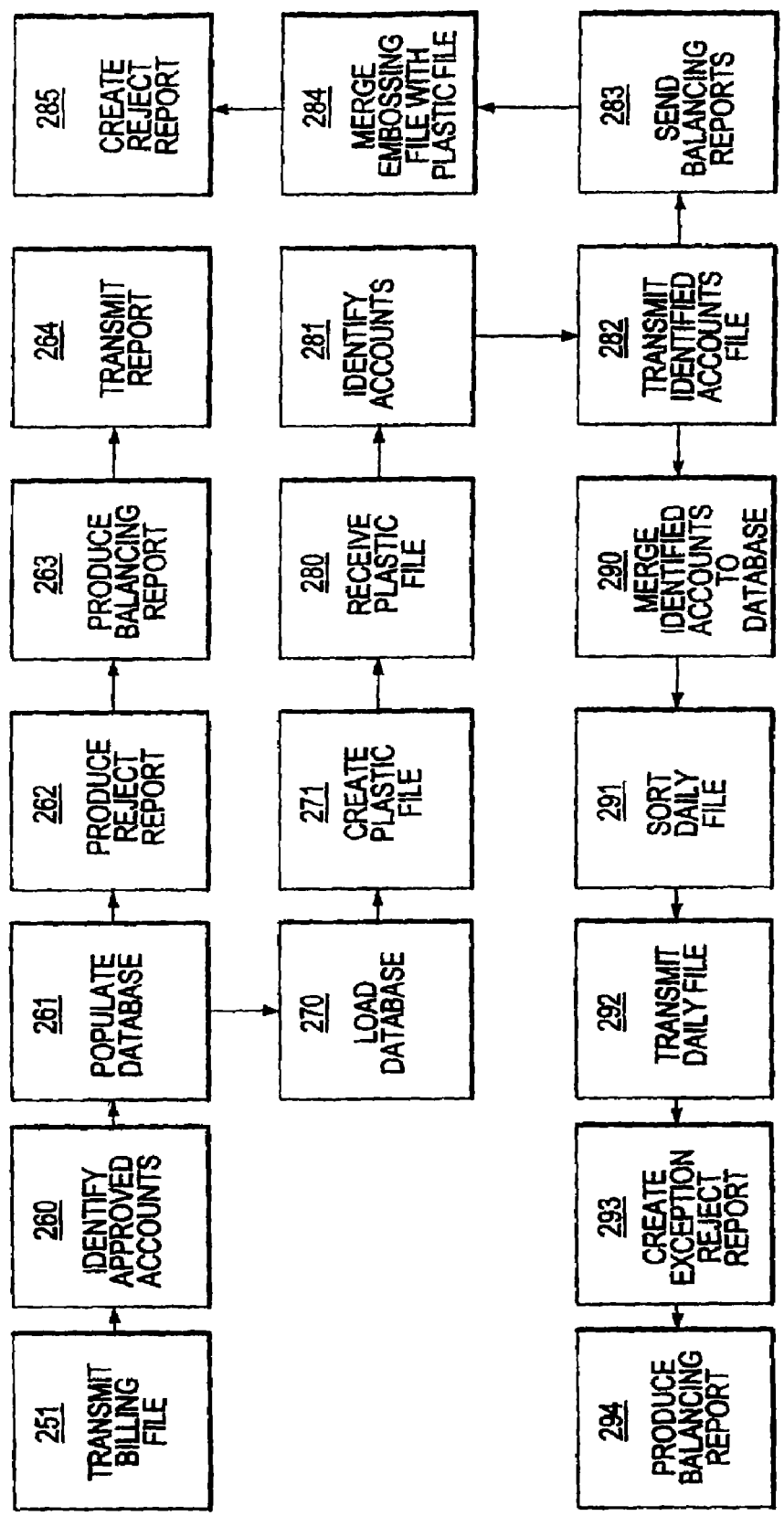
FIG. 2b is a flowchart of a portion of an exemplary new account process, complementing FIG. 2a, in accordance with the present invention.

In an exemplary new account process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 2a and 2b, regardless whether, or to which entities, the various process steps are delegated, the new account process is initiated by a consumer's submission of application information (step 210) to either the service partner 106 or the primary party 102. If the consumer 108 submits the information to the service partner 106, the service partner 106 may route the information to the primary party or the service partner may perform the initial processing of the application information (step 220). If the consumer 108 submits the application information to the card service engine 104, however, the primary party 102 receives the application (step 210) from the consumer 108 and routes (step 210) the information to the service partner 106, which performs the initial processing (step 220).

While the below steps may refer to the service partner enrolling the consumer, the invention contemplates only certain of the disclosed enrollment steps or no enrollment by the service partner. For example, because the transactions for each of the service partner services may include minimal value (e.g., $1 bus fare), the service partner may not have a need or desire to complete a complicated enrollment process. Moreover, the consumer may not want to disclose potentially private information to a public entity which operates the transportation services. In other embodiments, the consumer may already obtain a financial transaction account and card, so the registration and processing may only relate to adding the transportation account to the pre-existing financial account.

The initial processing (step 220) performed by the service partner 106 may include the steps of receiving (step 221) the application information, keying (step 222) each application information file for basic information, transferring (step 223) the application information into the service partner's database, creating (step 224) a unique application information file product control number for each application, creating (step 225) a standard variable byte file of new application data, and sending (step 226) the standard variable byte file of new application data via batch process interface/T1 line to the card service engine 104. The unique product control number is also applied to any physical application, which is also sent to retention. In an exemplary embodiment, this file does not contain any service partner 106 data.

As used herein, the term product control number refers to a number that identifies the primary party 102 and/or service partner 106 that keyed in the application and the date on which it was keyed. Also, as used herein, the term balancing report refers to a report that verifies and files information sent between two parties. Finally, the information administrator 112 records information, transfers files, and sends reports and other electronic communication between the primary party 102 and a service partner 106.

In addition to accomplishing the initial processing of new application information, the service partner 106 produces (step 230) a balancing report containing the total records of each file and transmits (step 231) the report to the primary party 102. The service partner 106 also produces (step 232) a new account aging report of any applications greater than a predetermined period of time, for example, 30 days. These reports are utilized by the information administrator 112 after each transmission. Finally, the service partner 106 returns (step 233) any paper applications and aligns (step 234) with the card service engine's retention guidelines.

Once the initial processing is complete, the card service engine 104 receives (step 240) the standard variable byte file from the service partner 106 and performs additional processing. This additional processing includes creating (step 241) necessary codes and updating (step 242) related tables required to identify the new consumer and the service partner 106 products, creating (step 243) a consolidated decisioning file, sending (step 244) an approved accounts file to the card service engine 104, processing (step 245) declined applications, updating (step 246) the balancing report containing total records of the transmitted file, creating (step 247) a job control language process to execute the information administrator balancing job, and creating (step 248) a back-up of the transmitted file and balancing reports in accordance with the card service engine's current standards. The consolidated decisioning file contains approved, declined, and cancelled service partner application information.

The consumer service administrator 114 extracts (step 250) all approved, declined, and cancelled service partner application information from the card service engine's consolidated decisioning file and transmits (step 251) a billing data file that is sorted, first by product control number and then by sequence number, to the service partner 106 containing data on approved, declined, and cancelled service partner accounts, excluding pending applications. The consumer service administrator 114 also produces (step 252) a balancing report containing total records of the transmitted file and creates a job control language process to execute the information administrator balancing job after receiving the service partner's transmission report. Finally, the consumer service administrator 114 creates (step 253) a back-up of the transmitted file and balancing report with an expiration of, for example, 90 days.

With all declined or cancelled applications, the billing data file contains the transaction date, the product control number, the consumer's name, the sequence number, and the status code indicating whether the status is approved, declined, or cancelled. With all approved applications, the billing data file contains the transaction date, the primary party's account number (basic and supplemental), the product control number, the consumer's name, the sequence number, and the status code indicating whether the status is approved, declined, or cancelled.

Once the service partner 106 receives the billing data file that was transmitted by the consumer service administrator 114, the service partner 106 identifies (step 260) approved accounts by the presence of an account number issued by the primary party 102 and populates (step 261) the service partner's database with the primary party's new account numbers. For any unrecognized product control numbers, the service partner 106 produces (step 262) a reject report to be used for operations reconciliation processes. This reject report includes the primary party's account number, if applicable, the consumer's name, the product control numbers, and the transaction date. The service partner 106 also produces (step 263) a balancing report containing total records of the received file and transmits (step 264) the report to the primary party 102. After receiving an approved account file from the card service engine 104, the card service engine 104 loads (step 270) the file onto its database, creates (step 271) a daily plastic file, and, periodically, sends (step 272) a plastic embossing file to the card generator 120.

The card generator 120, receives (step 280), periodically, the plastic file from the card service engine 104. Upon receipt of the plastic file, the card generator 120 identifies (step 281) all service partner charge and lending accounts on the primary party's renewal plastic file and transmits (step 282) an identified accounts file of all identified accounts to the service partner 106. The identified accounts file includes information such as the primary party's account numbers, consumer 108 names, the card generator processing identifiers, transaction dates, and the primary party's bag Ids. A new identified accounts file is created periodically for renewal and periodic processing. Balancing reports are also sent (step 283) to show the total number of accounts sent to the service partner 106.

Upon receipt of the identified accounts file from the card generator 120, the service partner 106 merges (step 290) the identified accounts file to the service partner 106 database by the primary party's new account numbers. The service partner 106 periodically sorts (step 291) the daily file by approved, declined, and cancelled in numeric sequential order to create a daily transportation file with service partner 106 transportation information. Finally, the service partner 106 transmits (step 292) the daily transportation file to the card generator 120.

For individual members, service partner 106 transportation data includes, for example, the service partner number, service partner member type, and a photo image. In general, other transportation data includes, for example, geographic data, loyalty information, a photo image flag indicator, the primary party's new account number, the card generator processing indicator, processing data, and the card generator bag-ID.

After transmitting the daily file to the card generator 120, the service partner 106 creates (step 293) an exception reject report containing invalid product control numbers, which are account numbers that did not result in a match on the service partner database. The exception reject report is used with the operations reconciliation process and includes the primary party's account number, consumer name, transaction date, the card generator processing indicator, and the primary party 102 bag-ID. Finally, the service partner 106 produces (step 294) a balancing report containing the total records of the received identified accounts file. This balancing report is utilized by the information administrator 112 after each transmission for balancing with the card generator 120.

After receiving the updated embossing information file from the service partner 106, the card generator 120 merges (step 284), using the primary party's new account number, the data from the updated embossing information file with the plastic file that was received previously from the card service engine 104. In addition, the card generator 120 embosses all required primary party 102 data, prints a consumer number on the signature panel, prints applicable service partner transportation data such as that which is described above, on the back of the primary party card, places the service partner transportation number in the third magnetic stripe position, converts the service partner transportation number to a bar code, prints the bar code on the back of the transportation card, and sends the transportation card to the consumer 108.

In addition, the card generator 120 creates (step 285) a reject report for all non-primary party account numbers or invalid card generator processing indicators received from the service partner 106. This reject report includes all data received on the service partner file except a photo image. The report is labeled "Invalid Accounts Received from Service Partner" and is used for operational reconciliation.

Finally, the card generator 120 re-sends, in a subsequent transmission to the service partner 106, namely account numbers that do not have a service partner transportation number. After a predetermined number of attempts, the information is removed from the embossing file and placed on the card generator's reject report. Balancing reports show the total number of accounts received from the service partner 106.

Card Replacement Processes

In an exemplary card replacement process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Regardless to which entities the various process steps are delegated, the card replacement process may be initiated by the primary party 102, in conjunction with the consumer 108, or by the service partner 106. Further, special procedures may be called out in cases of fraud or emergency. In an exemplary embodiment, after initial processing, a plastic card replacement process is initiated.

Figure 3A:
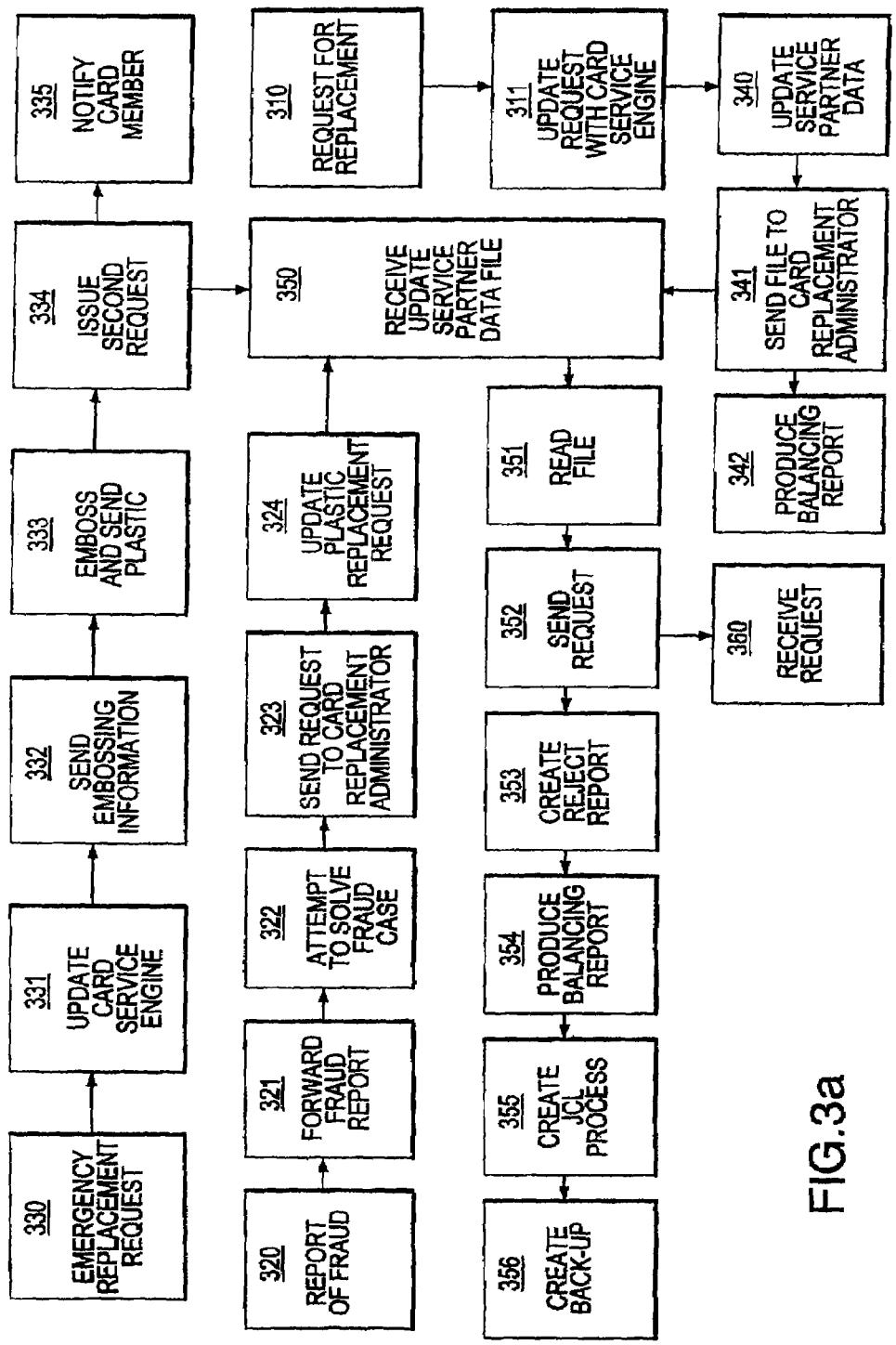
FIG. 3a is a flowchart of a portion of an exemplary multiple-service card replacement process, complementing FIG. 3b, in accordance with the present invention.
Figure 3B:
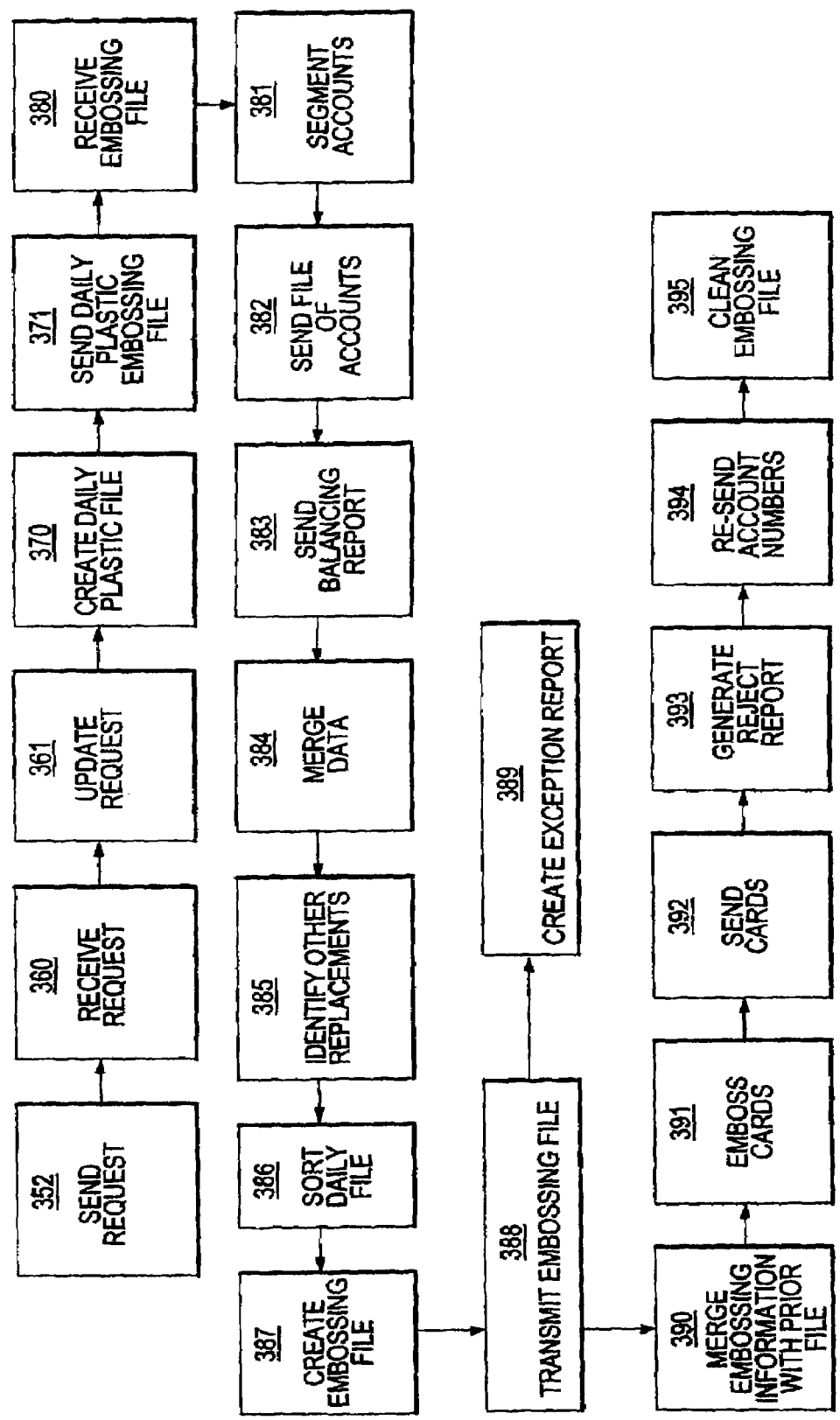
FIG. 3b is a flowchart of a portion of an exemplary multiple-service card replacement process, complementing FIG. 3a, in accordance with the present invention.

Referring to FIGS. 3a and 3b, if a consumer 108 requests (step 310) card replacement, the card replacement administrator 116 updates (step 311) the plastic replacement request with the card service engine 104 and thereby initiates the plastic card replacement process. If a consumer 108 reports (step 320) fraudulent activity on an account, the report is sent (step 321) to the fraud resolution administrator 118, which attempts (step 322) to solve the case and, if the claim is deemed valid, sends (step 323) a request to the card replacement administrator 116, which updates (step 324) the plastic replacement request with the card service engine 104 and thereby initiates the plastic card replacement process.

If a consumer 108 requests (step 330) emergency card replacement, the card replacement administrator 116 updates (step 331) the card service engine 104 to not issue a plastic card and updates the card server, which sends (step 332) embossing information to the card generator 120, which embosses (step 333) the plastic and sends it to the consumer 108. In an exemplary embodiment, these emergency cards do not contain any service partner data and expire at the end of the following month unless otherwise requested by the consumer 108. In addition, the card replacement administrator 116 issues (step 334) a second request to the card service engine 104 to issue service partner replacement plastic, thereby initiating the standard card replacement process. In cases of emergency card replacement, the consumer 108 is notified (step 335), first, that emergency card replacement plastic will preferably not contain service partner data and that the consumer 108 should seek assistance from the service partner help desk, second, that multiple-service card re-issuance will occur and will be received within a predetermined period of time, and third, that additional cards on the account may be required to be replaced if the service partner 106 determines that there are changes to transportation information.

The service partner 106 may initiate card replacement by updating (step 340) the service partner data and sending (step 341) a file to the card replacement administrator 116 indicating the consumers 108 who require new plastic cards. The service partner 106 also produces (step 342) a balancing report containing the total records of the transmitted file and transmits the report to the primary party 102. This report is used by the information administrator 112 after each transmission for balancing with the card generator 120.

After receiving (step 350) the updated service partner data file from the service partner 106, the consumer service administrator 114 reads (step 351) the file and sends (step 352) a request to the card replacement administrator 116 to create replacement plastic cards. The consumer service administrator 114 also creates (step 353) a reject report with the card replacement administrator 116 indicating service partner replacements that have invalid account numbers. Next, the consumer service administrator 114 produces (step 354) a balancing report containing the total records of the transmitted/received file. The consumer service administrator 114 also creates (step 355) a job control language process to execute the information administrator's balancing job. Finally, the consumer service administrator 114 creates (step 356) a back-up of the service partner replacement request file and balancing reports for a predetermined period of time, for example, 90 days.

Upon receipt (step 360) of the request from the consumer service administrator 114 to create replacement plastic cards, the card replacement administrator 116 updates (step 361) the plastic replacement request with the card service engine 104 and thereby initiates the plastic card replacement process.

As previously stated, the plastic card replacement process is initiated by a party's updating the plastic replacement request with the card service engine 104. Upon receipt of such an update, the card service engine 104 creates (step 370) a daily plastic file and sends (step 371) a daily plastic embossing file to the card generator 120.

Upon receipt (step 380) of the daily plastic embossing file from the card service engine 104, the card generator 120 segments (step 381) service partner accounts and sends (step 382) a file of all identified service partner accounts to the service partner 106. This file is transmitted daily and contains the primary party's account number, the consumer's name, the card generator processing identifier, transaction date, and the primary party's bag ID. Separate files are created for renewal and daily processing. Balancing reports are also sent (step 383) showing total number of accounts sent to the service partner 106.

Upon receipt (step 382) of the file showing all identified service partner accounts, the service partner 106 merges (step 384) the data contained in the file to the service partner database according to the primary party's new account number. At this point, the service partner 106 may also need to determine (step 385) whether additional consumers 108 in the relationship require their cards to be replaced due to any changes in service partner transportation data. Next, the service partner 106 sorts (step 386) the daily file by the basic cards first, then the supplemental cards, in numeric sequential order. In addition, the service partner 106 creates (step 387) an embossing information file with any new service partner transportation data and transmits (step 388) the embossing information file to the card generator 120. The service partner 106 also creates (step 389) an exception reject report for account numbers that did not result in a match on the service partner database. This report is for use with the operations reconciliation process and includes the primary party's account number, consumer's name, transaction date, the card generator processing indicator, and the primary party bag-ID. Finally, the service partner produces a balancing report containing total records of the received file.

Upon receipt of the embossing information file from the service partner 106, the card generator 120 merges (step 390) the data from the service partner's embossing information file with the daily plastic embossing file previously received from the card service engine 104. For new account numbers that do not have a service partner transportation number, plastic cards will not be embossed. Next, the card generator 120 embosses (step 391) the plastic cards and sends (step 392) the replacement cards to the consumers 108. The card generator 120 also generates (step 393) a reject report for all non-primary party account numbers or invalid card generator processing indicators received from the service partner 106. This report includes all data received on the service partner file except the photo image. The report is labeled "invalid accounts received from service partner," and the report is used for operational reconciliation. Finally, the card generator 120 re-sends (step 394) to the service partner account numbers that did not have a service partner transportation number. These account numbers are sent in a subsequent transmission. After a predetermined number of attempts, the information is removed (step 395) from the embossing file and placed on the PDR reject report.

Card Maintenance Processes/Service Partner Cancellation

In an exemplary service partner cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIG. 4, regardless to which entities the various process steps are delegated, the service partner cancellation process is initiated by the service partner 106, which transmits (step 410) a cancellation file to the primary party 102. The cancellation file contains data elements for all the primary party 102 consumers 108 who have cancelled their services with the service partner. These data elements include the cancellation date, the primary party's new account number, and the consumer's name.

Upon receipt of the cancellation file from the service partner 106, the primary party 102 produces (step 420) a service partner cancellation report on the report generator. This report is used by card service providers to transfer (step 430) consumers 108 to a new product. The primary party 102 also sends (step 421) a report to the consumer service administrator 114 and produces (step 422) a balancing report containing total records of the received cancellation file. In addition, the primary party 102 creates (step 423) a job control language process to execute the information administrator balancing job. Finally, the primary party 102 creates (step 424) a backup of the service partner's cancellation file and balancing reports for 90 days.

Card Maintenance Processes/Primary Party Consumer Cancellations or Transfers to non-Service Partner Products.

Figure 5A:
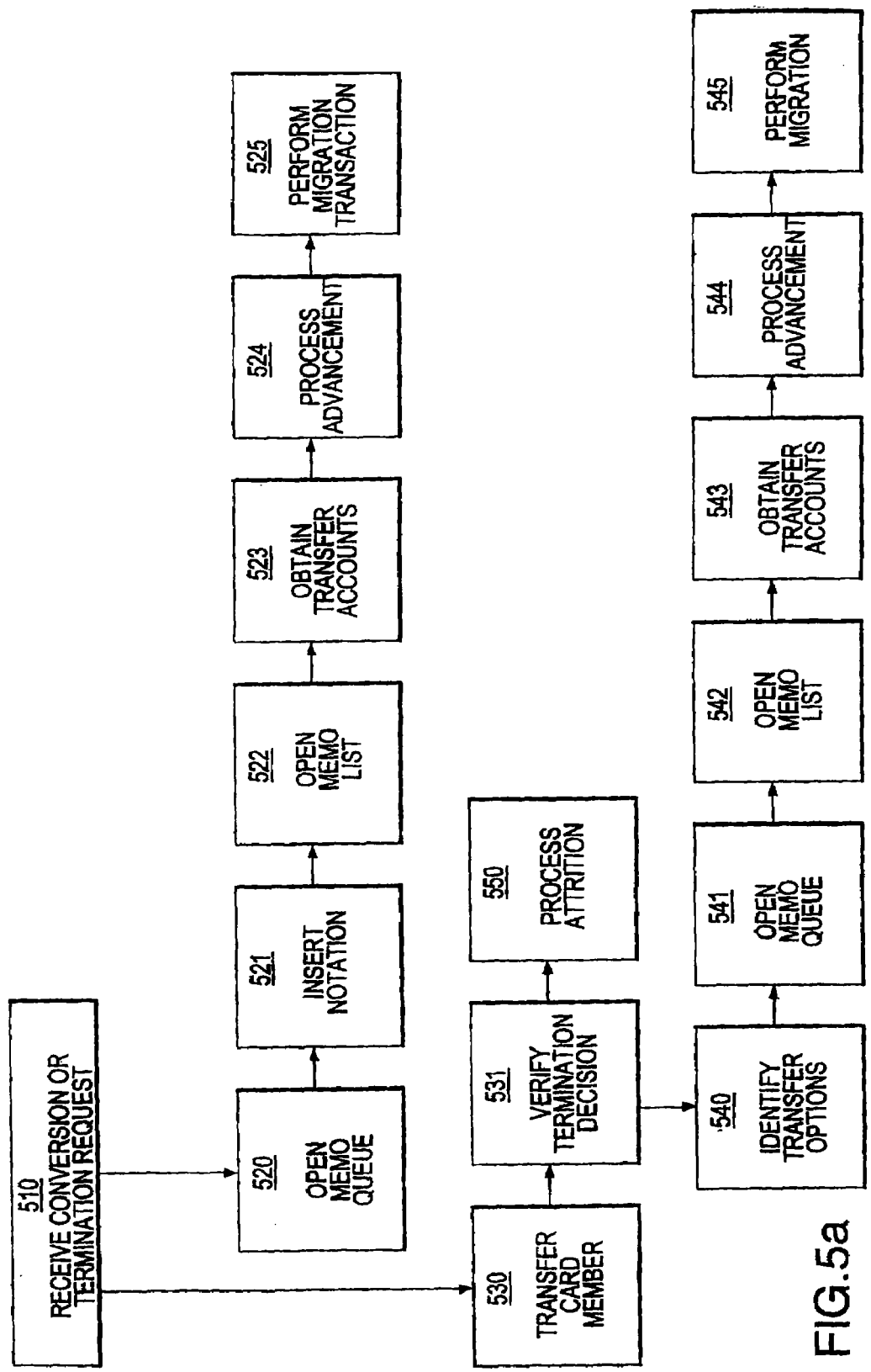
FIG. 5a is a flowchart of a portion of an exemplary multiple-service card primary party cancellation process, complementing FIG. 5b, in accordance with the present invention; and, FIG. 5b is a flowchart of a portion of an exemplary multiple-service card primary party cancellation process, complementing FIG. 5a, in accordance with the present invention.

In an exemplary consumer cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 5a and 5b, regardless to which entities the various process steps are delegated, the consumer cancellation process is initiated by the primary party's consumer service administrator's 114 receiving (step 510) a request from a consumer 108 to terminate or convert to another product.

If the consumer 108 requests not to terminate, and the consumer 108 specifies a product or transportation service, to which the consumer 108 wants to transfer, the consumer service administrator 114 opens (step 520) a memo queue and inserts (step 521) a notation indicating that the consumer 108 wants to transfer to a specific product or transportation service. In addition, the consumer service administrator 114 opens (step 522) a memo list and obtains (step 523) accounts that must be transferred to a new IA. Finally, the consumer service administrator 114 processes (step 524) the advancement of the rebate and performs the migration transaction to move the consumer 108 to the new product.

If the consumer 108 wants to terminate, or if the consumer 108 fails to specify a product or transportation service, to which the consumer 108 wants to transfer, the consumer service administrator 114 dial transfers (step 530) the consumer 108 to the transportation administrator, which verifies (step 531) that the consumer 108 wants to terminate.

If the consumer's desire to terminate cannot be verified, the transportation administrator identifies (step 540) consumer transfer options and opens (step 541) a memo queue specifying the product, to which the consumer 108 wants to transfer. In addition, the consumer service administrator 114 opens (step 542) a memo list and obtains (step 543) accounts that must be transferred to a new IA. Finally, the consumer service administrator 114 processes (step 544) the advancement of the rebate and performs (step 545) the migration transaction to move the consumer 108 to the new IA.

If the consumer's 108 desire to terminate is verified, the transportation administrator processes (step 550) the attrition, causing the card service engine 104 to update (step 551) the file with a cancel code. In addition, the card service engine 104 creates (step 552) and/or updates (step 553) the change/renewal file with the transfer code for extraction by the consumer service administrator 114.

Once the consumer service administrator 114 has extracted (step 560) service partner/primary party accounts from the change/renewal file, the consumer service administrator 114 creates (step 561) a cancellation file of all consumers 108 who have cancelled their multiple-service card. Next, the consumer service administrator 114 transmits (step 562) the cancellation file to the service partner 106 and produces (step 563) a primary party/service partner co-brand card cancellation report on the report generator. This report will be utilized by card provider services to transfer (step 570) consumers 108 to a new primary party product. The consumer service administrator 114 also produces (step 571) a balancing report containing total records of the transmitted file and creates (step 572) a job control language process to execute the information administrator balancing job. Finally, the primary party 102 creates (step 573) a backup of the service partner cancellation file and balancing reports for 90 days.

Upon receipt (step 580) of the primary party's cancellation file from the consumer service administrator 114, the service partner 106 turns the credit flag indicator to N, thereby severing (step 581) the system linkage. In this situation, the service partner 106 may issue (step 582) a stand alone transportation card. Finally, the service partner 106 produces (step 583) a balancing report containing the total records of the transmitted file. This balancing report will be utilized (step 584) by the information administrator 112 after each transmission for balancing with the card generator 120.

As one skilled in the art will appreciate, the above described transaction entry interface, as well as any or all other aspects of the present invention, may include any suitable form of encryption and/or other security measures either currently known or hereafter devised.

The invention also includes a system and method for facilitating a loyalty system which is associated with geographic locations and/or services and goods offered in a specific geographic area. In this regard, the loyalty points may be used to pay for the transportation services in a particular geographic area. In different embodiments, the loyalty points may be earned within a specific geographic location, then redeemed in one geographic location, a subset of locations or without restrictions. Similarly, the loyalty points may be earned in one geographic location, a subset of locations or without restrictions, then redeemed only in a specific geographic location. Details of the loyalty point earn and redemption process will be described in more detail below. Interaction with the system may include communication to consumer service representatives, entry into webpages or any of the computing devices set forth herein. The financial or loyalty accounts may or may not be associated with any of the transaction accounts or cards set forth below.

The geographic features of the system may be implemented using new types of data collected during the transaction or using existing data that is typically collected in a transaction, wherein the existing data may also be associated with geographic areas such as, for example, zip codes, retailer identification codes, service establishment codes, SKU codes, UPC manufacturer codes and/or the like. The collected information may be associated with any previously known information to perform data analysis related to the loyalty program on a local or network level (described in more detail below).

The geographic area information may be associated with the consumer, merchant, processing system and/or any other part of the overall system. For example, a consumer may have a home zip code in New Jersey with a work zip code in New York City, so the system may determine that the consumer still qualifies for reward points from merchants with zip codes based in New York City. The system may also determine that a "double point" promotion may apply to purchases of products originating from manufacturers in Tennessee. In a more complex embodiment, the system may encourage New Jersey residents to shop for soap products from an Arizona manufacturer (e.g., Dial Corporation) which are sold by a New York merchant. As such, the system may acquire, utilize and/or associate the consumer home zip code, the merchant building zip code, and the SKU information from the soap. In another embodiment, the rewards may have a theme related to the city. For example, New Orleans awards may be related to Jazz shows and Mardi Gras activities, while New York City awards may be related to Broadway shows, dining and other entertainment or sports venues. The awards may also include full geographic "experiences" such as, for example, dinner, backstage passes, cocktails with the cast, and movie premiers.

The system may include online interfaces, dial-up interfaces through POS terminals or any of the other hardware, software and communications discussed herein. In one embodiment, the system is configured with one product platform with a modularized approach to facilitate the development of market specific rewards and communication materials. Particularly, any geographic location and associated merchants may be input into a version of the present invention such that the invention facilitates similar features and functions in any newly created geographic region. For example, the system may be fully functional with various merchants, rewards and residents in the Manhattan, N.Y. area. Different data may be inputted into the same system in order to facilitate similar functionality in the Phoenix, Ariz. area, along with creating rewards and marketing material related to Phoenix merchants. In this regard, a participant may use a particular ID or password to access the system online, wherein the particular ID instructs the system to provide functions and marketing materials or displays related to the appropriate geographical region. For example, inputting ID #1234 into a web site may result in a web page displaying various rewards redeemable at various Manhattan merchants. Similarly, inputting ID #5678 into the same web site may result in a web page displaying various rewards redeemable at various Phoenix merchants.

The present invention also includes facilitating the transfer of geographic area loyalty points between accounts. In an exemplary embodiment, the invention includes facilitating the substantially real-time transfer of geographic area loyalty points between accounts. While the invention will be discussed in terms of a general transfer of geographic area loyalty points, one skilled in the art will appreciate that the transfer may include a deduction from a first account and a crediting of a second account. Moreover, the transfer may involve any portion of the points transferred in real-time, certain points transferred in a batch transfer, certain points transferred upon a triggering event, certain points transferred over time and/or certain points transferred upon satisfaction of a condition or rule.

In one embodiment, the system includes any hardware and/or software discussed herein or known in the art suitably configured for receiving a transfer request (e.g., consumer request, triggering event, etc) for a transfer of a any portion of geographic area loyalty points, accessing and analyzing the total number of loyalty points in the transferor account related to a particular geographic area to determine if a sufficient number of points exist, analyzing the type/level of consumer and type/level of points (including geographic area associated with the points) to be involved in the transfer, determining if any rules exist for restricting or limiting the transfer of points (e.g., only transfer points to an account having other points in a particular geographic area), using a conversion engine to convert the point value to an appropriate point value in the transferee account, deducting the requested loyalty points from the transferor account, and increasing the point balance in the transferee account.

In accordance with the present invention, geographic area loyalty points associated with a certain loyalty system may be transferred to other loyalty point accounts within the same loyalty system or to a loyalty point account in any other loyalty point system. For example, Hilton Reward points may be transferred to a United Airlines frequent flyer account. In one embodiment, a conversion engine facilitates any point value conversions that may be appropriate. For example, if a consumer desires to transfer five hundred Hilton Reward points to a United Airlines frequent flyer account, the conversion engine may determine that the five hundred Hilton Rewards points only translate into one hundred United Airlines frequent flyer points. As such, the system would only increase the United Airlines frequent flyer account by one hundred points. The rules or formulas associated with the conversion engine may be pre-established by the loyalty point system hosts. The transfer of any portion of loyalty points in a consumer account may be initiated upon a triggering event such as, for example, a request by the transferor, a request by a transferee, a request by a loyalty system host, a request by a third party, a transfer on a certain date or time, a percentage of points transferred during certain time periods and/or an automatic transfer upon a pre-established condition or data point. The transfer may also include certain conditions that must be met prior to, during and/or after the transfer. If certain conditions are not met, the transfer may be voided or expire and/or any portion of the loyalty points may be returned to the original transferor, to the loyalty system, to another consumer loyalty account or to any other third party. For example, after receiving transferred loyalty points, if the transferee does not earn a certain amount of loyalty points on her own in a certain geographic area, the transferred loyalty points are transferred to another supplementary member. The system may also credit any portion of the loyalty points to one or more loyalty point accounts, wherein any geographic area restrictions may or may not apply. For example, the consumer may request that the loyalty points be transferred to an account associated with a family member, a friend, a charitable organization and/or the like.

The transaction card of the present invention may also include a dual purpose transaction device which combines geographic-based loyalty functionality, financial transaction functionality (e.g., charge card) and access functionality (e.g., access to public transportation, including payment of the transportation fare). The card may include one or more magnetic stripes related to each functionality. The card or other transponder device may alternatively include two different RFID signals for each functionality.

As used herein, a "geographic area" or similar terms may include all or any portion of any street, city, county, state, country, continent, region (e.g., SoHo district, Chinatown), or any other areas, including combinations or subsets of areas. The geographic areas may relate to any of the participants, products, services or identifications. The geographic areas may relate to any associated geographic area such as, for example, a geographic area associated with a participant's home residence, work residence, travel areas or the like. The geographic area may also be automatically established based on the geographic area where a participant is located at the time (or at any established time period) based on, for example, cellular phone caller location relative to cellular towers or a global positioning system. The geographic areas may also be associated with where the product is manufactured, distributed, sold or the like. Moreover, while certain embodiments may refer to only a specific geographic area for brevity, the invention also contemplates other similar embodiments for multiple geographic areas or subsets of areas.

The various system components discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential".

We claim:

1. A multiple service transaction device configured to:
   access financial services provided by a provider of financial services via a financial account, wherein said financial account is associated with said multiple service transaction device;
   access transportation services provided by a service partner via a service partner account, wherein said service partner account is associated with said multiple service transaction device;
   provide, based on a location identifier received from said service partner, a consumer access to a transportation system provided by said service partner; and,
   provide a consumer access to said transportation system provided by said service partner upon payment of a fee, wherein said fee associated with said transportation system is transferred from said financial account to said service partner account.

2. The device of claim 1, wherein said device is configured to provide said consumer access to said transportation system provided by said service partner in exchange for loyalty points.

3. The device of claim 1, wherein said device is configured to provide said consumer access to said transportation system provided by said service partner upon payment of a fee and in exchange for loyalty points when a balance of said loyalty points is not sufficient to pay said fee.

4. The device of claim 1, wherein said device is configured to provide said consumer access to said transportation system provided by said service partner in exchange for loyalty points, wherein said loyalty points are exchanged for access to said transportation system when said loyalty points exist.

5. The device of claim 1, wherein said device is configured to provide said consumer access to said transportation system provided by said service partner when said service partner resides within a predefined geographical area.

6. The device of claim 1, wherein said device configured to access said transportation services includes said device configured to credit an account of said service partner.

7. The device of claim 1, wherein said transportation system includes at least one of a bus, subway and train.

8. A method for obtaining access to a transportation system by using a multiple service transaction device to charge a fee to a financial account, wherein said fee is related to said access, said method including:
- maintaining, by a provider of credit services, said financial account corresponding to said multiple service transaction device of a consumer;
- receiving a request to charge said fee from said service partner, wherein said request includes location data indicative of a geographic location of said transportation system;
- determining that said service partner is at least one of located within a predefined geographic location and affiliated with said provider of credit services;
- adjusting at least one of a loyalty account and said financial account based upon said request and said fee; and,
- crediting said service partner account.

9. The method of claim 8, further comprising providing said multiple service transaction device to a consumer, wherein said multiple service transaction device is configured to provide funds from said financial account to a service partner account.

10. The method of claim 8, wherein said step of adjusting is completed in at least one of substantially real-time, batch mode, periodically, upon request, and based on an algorithm.

11. A method for obtaining a service of a service partner by using a multiple service transaction device to redeem loyalty points, said method including:
- maintaining, via a provider of credit services, a database for storing loyalty points in a loyalty account corresponding to a consumer;
- receiving a request, from said multiple service transaction device, to redeem an amount of said loyalty points to obtain said service of said service partner, wherein said request includes location data indicative of a geographic location of said service partner;
- determining that said service partner is at least one of located within a predefined geographic location and affiliated with said provider of credit services;
- adjusting said loyalty account based upon said requested amount of said loyalty points to redeem; and,
- crediting said service partner account.

12. The method of claim 11, wherein said crediting said service partner account includes at least one of crediting said account of said service partner with said loyalty points, and converting said loyalty points to a monetary value and crediting said monetary value to said account of said service partner.

13. The method of claim 11, wherein said loyalty points are associated with said geographic location of said service partner.

14. The method of claim 11, wherein said loyalty points are geographic area loyalty points obtained when said consumer conducts purchases within a geographic area.

15. The method of claim 11, wherein said loyalty points are geographic area loyalty points obtained when said consumer conducts purchases within a geographic area and further comprising determining that said service partner is within a redemption area associated with said geographic area loyalty points based on said location data.

* * * * *